United States Patent [19]
Chang et al.

[11] Patent Number: 6,147,838
[45] Date of Patent: Nov. 14, 2000

[54] AIR BEARING SLIDER WITH SHAPED TAPER

[75] Inventors: Ciuter Chang, Fremont; Christopher A. Lee, Pleasanton; Mark J. Donovan, San Jose, all of Calif.

[73] Assignee: Read-Rite Corporation, Milpitas, Calif.

[21] Appl. No.: 09/514,391

[22] Filed: Feb. 28, 2000

Related U.S. Application Data

[62] Division of application No. 08/797,169, Feb. 10, 1997.

[51] Int. Cl.[7] .................................................. G11B 21/20
[52] U.S. Cl. .......................................................... 360/235.6
[58] Field of Search ........................... 360/235.6, 235.8, 360/236.2, 236.4, 236.6, 236.9

[56] References Cited

U.S. PATENT DOCUMENTS 5,212,608  5/1993  Yoneoka .................................. 360/103
5,430,591  7/1995  Yakeuchi et al. ....................... 360/103

Primary Examiner—David Davis
Attorney, Agent, or Firm—Nathan N. Kallman

[57] ABSTRACT

An air bearing slider used with a thin film magnetic head is formed with a corner recess and a taper at the leading edge. The taper is disposed between the corner recess and one side of the slider. A central polygon-shaped recess is bounded by pads which are joined by a connecting section. In an alternative embodiment, a recess at the leading edge separates the taper into sections. In another embodiment, a second corner recess is provided at the leading edge and the taper is disposed between the first and second corner recesses. The shaped recesses and tapers improve the flying characteristics of the slider and enhance air bearing stiffness. A single etch process is used to form the recesses and side reliefs of the slider.

5 Claims, 2 Drawing Sheets

AIR BEARING SLIDER WITH SHAPED TAPER

This is a division of application Ser. No. 08/797,169 filed Feb. 10, 1997.

FIELD OF THE INVENTION

This invention relates to an air bearing slider with a patterned leading taper region and configured rails or pads and recesses.

DESCRIPTION OF THE PRIOR ART

Magnetic head assemblies that fly relative to rotating magnetic disks are used extensively in disk drives for recording and reading data. One objective when using a flying head on which at least one magnetic transducer is deposited in a transducing relationship with a magnetic recording disk is to maintain a substantially constant flying height measured between the slider transducer and the disk surface. Also, by maintaining a constant flying height at a close spacing between the transducer and the disk surface, it is possible to record short wavelength or high frequency signals thereby realizing high density and high storage capacity data recording.

Air bearing sliders used in disk drives typically have a leading edge with a taper at the leading edge and a trailing edge at which thin film transducers are deposited. Typically, the sliders have tapered portions at the leading edge and longitudinal rails or pads that extend from the leading edge tapers towards the trailing edge. The tapers may be shaped and of such length as to provide fast pressure buildup during takeoff of the slider from a resting position to flying attitudes relative to the disk. The dimensions and shapes of the tapers and rails are instrumental in determining the flying characteristics of the head. The rail design determines the pressure generated at the air bearing surface of the slider. In effect, the pressure distribution underneath the slider determines the flying characteristics, including flying height, pitch and roll of the head relative to a rotating magnetic disk. Other characteristics that are affected by the configuration of the air bearing surface of a slider are takeoff velocity, air bearing stiffness and track seek performance. It is highly desirable to fly the slider at a substantially constant flying height close to the disk surface, while simultaneously providing fast takeoff and good track seek characteristics that can affect drive reliability. These objectives should be attained with simplified, low cost manufacturing processes.

SUMMARY OF THE INVENTION

An object of this invention is to provide an air bearing slider that affords a substantially constant flying height.

Another object is to provide an air bearing slider with low takeoff velocity and minimum track seek flying height variation.

Another object is to provide an air bearing slider that has enhanced air bearing stiffness which results in a tighter flying height distribution due to manufacturing tolerance.

According to this invention, the air bearing surface of an air bearing slider is formed with configured taper and rails or pads that define a shaped central recess. In one embodiment of the invention, a continuous taper region is formed at the leading edge of the slider between one side of the slider and a corner recess region. In an alternative embodiment, leading edge taper portions separated by a recessed area are provided, with a corner recess region adjacent to one of the taper portions. In a third embodiment of the invention, a leading edge taper is located between two corner recess regions. In each embodiment, a polygon type central recess is defined between the connecting rails or pads of the air bearing surface. Each recess is etched to the same depth in a single process step, by reactive ion etching or ion milling for example.

BRIEF DESCRIPTION OF THE DRAWING

The invention will be described in greater detail with reference to the drawing in which.

Similar numerals refer to similar elements in the drawing. It should be understood that the sizes of the different components in the figures are not necessarily to scale and are shown for visual clarity and for the purpose of explanation.

DETAILED DESCRIPTION OF THE INVENTION

The invention will be described with reference to a nanoslider, which has dimensions that are about 50% of a conventional slider. A nanoslider is typicaly 0.080 inch long, 0.063 inch wide and 0.017 inch high. The invention is also applicable to other size sliders, such as picosliders which have dimensions about 30% of a conventional slider.

Figure 1:
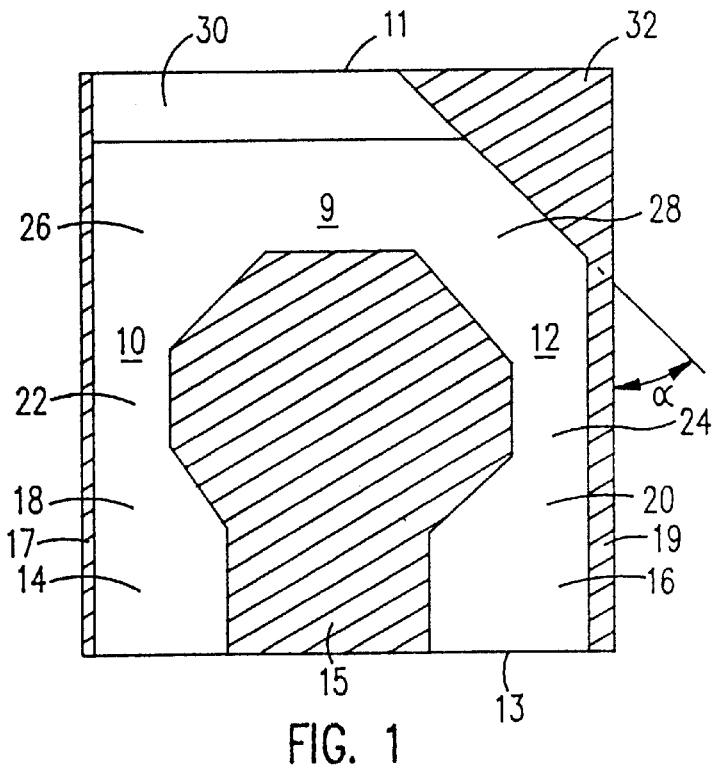
FIG. 1 is a top view depicting an air bearing surface of an air bearing slider configured in accordance with this invention.

With reference to FIG. 1, an air bearing slider is formed with two pads 10, 12 with a connecting section 9. The pads 10, 12 and connecting section 9 define a polygon-type central recess 15 which is substantially centered about the longitudinal axis of the slider, which axis extends between the leading edge 11 and the trailing edge 13 of the slider. The recess 15 extends from the connecting section 9 to the trailing edge 13 of the slider.

As illustrated in FIG. 1, one configuration of the air bearing surface (ABS) of the slider of this invention is made with a corner recess region 32, which is substantially triangular in shape. The angle formed between the side of the slider and the hypotenuse of the triangle of the corner recess region is in the range of about 30–60 degrees. At one side of the slider, a side relief 17 extends fully between the leading edge 11 and trailing edge 13, whereas at the other side of the slider, a side relief 19 extends from the trailing edge 13 to the angular side or hypotenuse of the triangular recess 32.

The pad 10 is formed with a trapezoidal region 18 and a trapezoidal region 26 with a narrowed rectangular region 22 between the trapezoidal regions 18 and 26, and between a side relief 17 and the recess 15. Following the trapezoidal region 18, a rectangular area 14 is formed at the trailing end of the slider between the recess 15 and the trapezoidal region 18. At the other side of the slider and at the opposite portion of the recess 15, the pad 12 is formed with a rectangular area 16 corresponding to the rectangular area 14; a trapezoidal region 20 corresponding to the trapezoidal region 18; a narrowed rectangular region 24 corresponding to the rectangular region 22; and a trapezoidal region 28 opposite to trapezoidal region 26. The widths of the opposing regions typically have different dimensions. Also the trapezoidal region 28 differs in shape from the opposing region 26 because the corner recess 32 cuts across region 28.

The pads 10, 12 and connecting section 9 provide superambient air pressure regions on the air bearing surface of the slider, whereas the recess 15 and recess 32 produce opposing subambient pressure regions.

One feature of the invention, which enables enhanced flying performance of the slider with low takeoff velocity, is a configured taper 30 that is disposed at the leading edge of the slider between one portion of the angled side or hypotenuse of the recess 32 and the side relief 17, as shown in FIG. 1. The taper 30 is trapezoidal wherein the side of the taper contiguous with the hypotenuse of the recess 32 is angled. The angle $\alpha$ between the side relief 19 and the hypotenuse is in the range of 30–60 degrees approximately.

In a specific implementation of the invention, the widths of the rectangular regions 22 and 24 measured between the side reliefs and the recess 15 were about 0.008 inch respectively, and the widths of the rectangular areas 14 and 16 were about 0.015 inch respectively. The dimension of the taper 30 measured from the leading edge 11 to the connecting section 9 is about 0.008 inch and the overall length of the taper 9 from the side relief 17 to the recess 32 is about 0.040 inch. The dimension of the connecting section 9 measured from the taper 30 to the recess 15 is about 0.010 inch.

Figure 2:
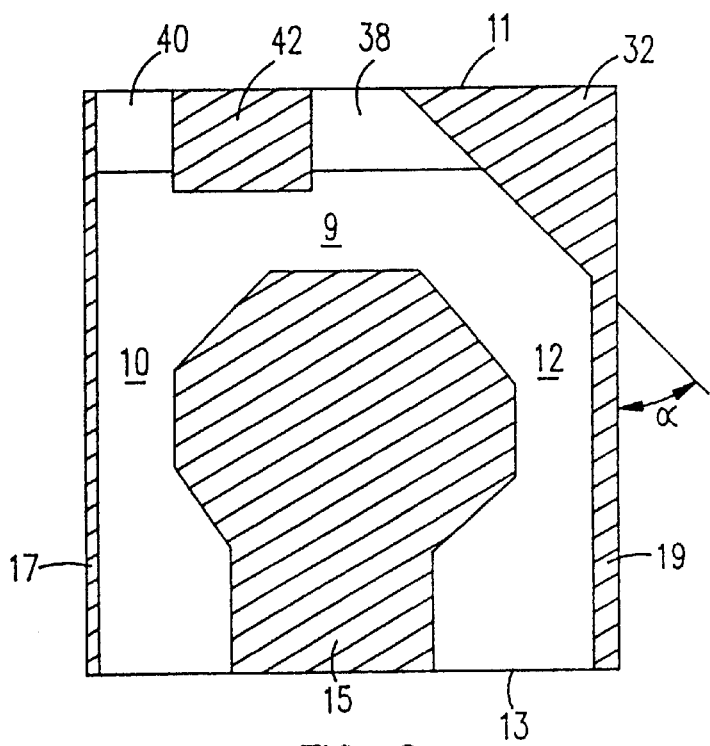
FIG. 2 is a top view of an alternative embodiment of the invention.

In an alternative embodiment, as illustrated in FIG. 2, the leading edge taper 30 of FIG. 1 is divided by a recess 42 that separates a rectangular region 40 and a trapezoidal region 38. A part of the recess 42 extends into the connecting section 9. The additional recessed area serves to bring the leading edge of the slider closer to the surface of the rotating magnetic storage disk during operation of a disk drive so that the pitch of the slider relative to the disk is optimized.

Figure 3:
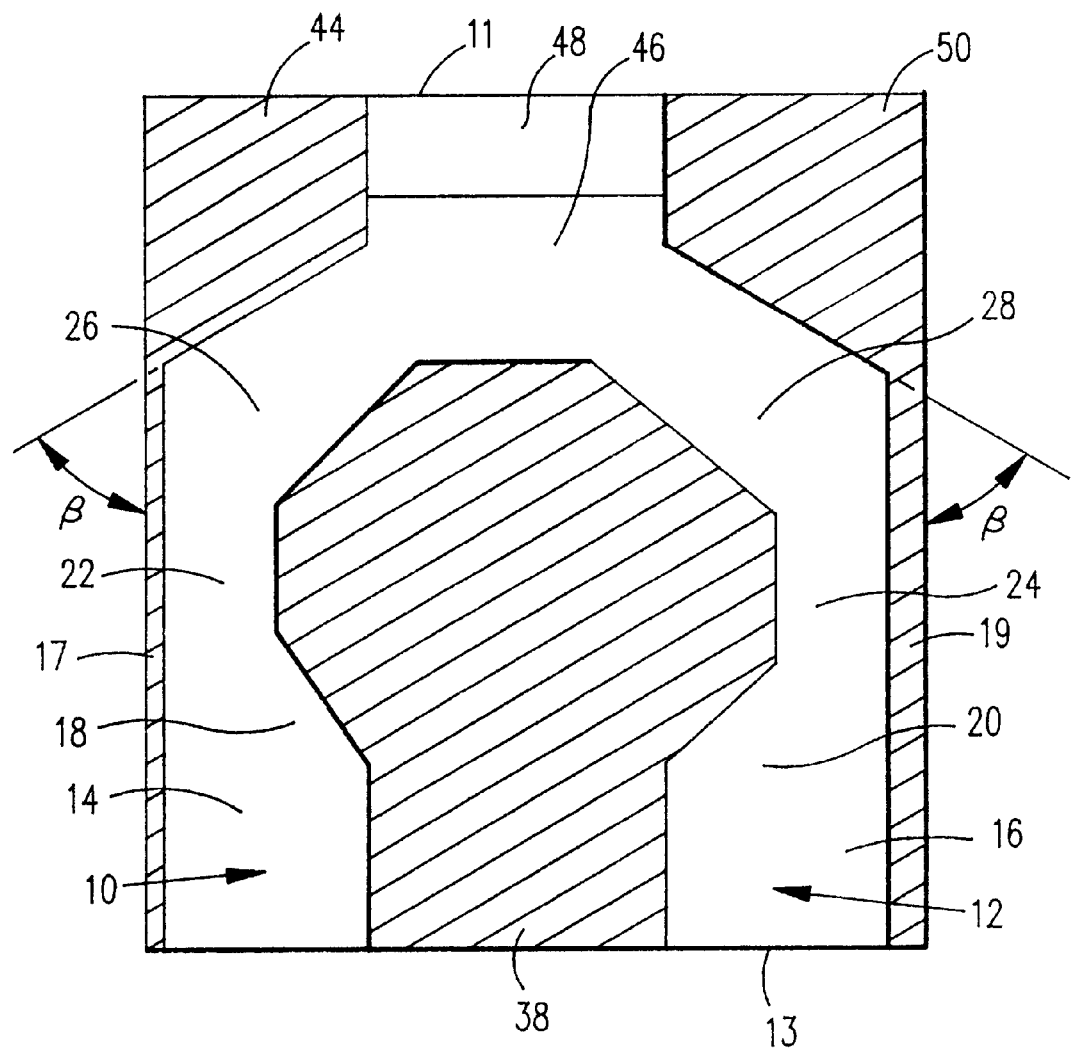
FIG. 3 is a top view of a third embodiment of the invention.

FIG. 3 illustrates another embodiment of the invention wherein trapezoidal corner recesses 44 and 50 are disposed about the sides of a central taper 48. The corner recesses are made with different areas. The section 46 connecting the pads 10 and 12 is defined by the central taper 48, the angled sides of the trapezoidal recesses 44 and 50, and portions of the inner sides of the recesses 44 and 50. The angles $\beta_1$ and $\beta_2$ between the angled sides of the recesses 44 and 50 and the side reliefs 17 and 19 are preferably about 15–45 degrees. This ABS configuration allows better control of flying attitudes of the slider.

The recesses in each embodiment as well as the side reliefs are etched to the same depth, which is about 2–5 microns. Etching is effectuated with a single etch step using available techniques such as ion milling or reactive ion etching. The leading edge tapers are mechanically lapped so that the resulting pressure distribution across the rails and the ABS can be controlled. Each slider has one or more thin film transducers at the trailing end, as is well known in the art.

The advantages of this invention are constant flying height, fast takeoff with low takeoff velocity, improved air bearing stiffness and good track seek performance.

It should be understood that the geometry, dimensions and parameters described above may be modified within the scope of the invention. For example, the widths and lengths of the rails may be modified depending upon the disk drive operating characteristics. Also the etch depths of the recesses may differ for different applications. The rails and the central recess may vary in proportions depending upon the slider size. Other modifications may be made when implementing the invention for a particular environment. While the invention has been described in relation to a nano-sized slider, it should be understood that the present concept may be applied to other sliders of different sizes.

What is claimed is:

1. An air bearing slider formed with an air bearing surface having a leading edge and a trailing edge with substantially parallel first and second slider sides extending from said leading edge to said trailing edge, said slider having a central longitudinal axis between said edges, comprising:

at least one thin film magnetic transducer disposed at the trailing edge of said slider for transducing action with a magnetic disk;

a taper disposed partially at said leading edge including a rectangular recess disposed at said leading edge, said rectangular recess dividing said taper into separated first and second sections, said first section being substantially rectangular and said second section having an angled side;

first and second air bearing nonrectangular pads asymmetric relative to said central longitudinal axis, said pads extending to said trailing edge and having an air bearing connecting section therebetween;

a central recess disposed between said air bearing pads, said central recess being asymmetric relative to said central longitudinal axis and formed with a polygon shaped portion and a rectangular recess portion, said rectangular shaped portion disposed between said polygon recess portion and said trailing edge, said polygon shaped recess portion disposed between said connecting section and said rectangular recess portion; and a triangular corner recess formed at a corner of said slider, said triangular corner recess having a first side contiguous with said leading edge and a second side contiguous with said second slider side and a third side contiguous with said connecting section, said second bearing pad, and said angled side;

first and second side reliefs formed respectively along said first and second side of said slider, said second side recess being contiguous with said angled side.

2. An air bearing slider as in claim 1, wherein said recesses and said side reliefs are etched to the same depth.

3. An air bearing slider as in claim 2, wherein said etched depth is about 2 to 5 microns.

4. An air bearing slider as in claim 1, wherein said taper is continuous from said first side relief to said triangular first corner recess.

5. An air bearing slider as in claim 1, wherein said triangular corner recess is patterned as a hypotenuse extending between ends of said sides of said triangular corner recess, said hypotenuse being disposed at an angle between 30–60 degrees relative to the sides of the slider.

* * * * *